Nov. 15, 1938.  O. G. SIMMONS  2,137,146
METHOD OF FINISHING GEARS
Filed March 7, 1935   8 Sheets-Sheet 1

FIG. 1

INVENTOR.
OLIVER G. SIMMONS
BY
Kwis Hudson & Kent
ATTORNEYS

FIG. 2

Nov. 15, 1938.　　　O. G. SIMMONS　　　2,137,146
METHOD OF FINISHING GEARS
Filed March 7, 1935　　　8 Sheets-Sheet 3

INVENTOR.
OLIVER G. SIMMONS
BY
Kwis Hudson & Kent
ATTORNEYS

Nov. 15, 1938.　　　O. G. SIMMONS　　　2,137,146
METHOD OF FINISHING GEARS
Filed March 7, 1935　　　8 Sheets-Sheet 4

INVENTOR.
OLIVER G. SIMMONS
BY Kwis Hudson & Kent
ATTORNEYS

Nov. 15, 1938. O. G. SIMMONS 2,137,146
METHOD OF FINISHING GEARS
Filed March 7, 1935   8 Sheets-Sheet 5

INVENTOR.
OLIVER G. SIMMONS
BY
Kris Hudson & Kent
ATTORNEYS

Nov. 15, 1938.   O. G. SIMMONS   2,137,146
METHOD OF FINISHING GEARS
Filed March 7, 1935    8 Sheets-Sheet 8

INVENTOR.
OLIVER G. SIMMONS
BY
Kwis, Hudson & Kent
ATTORNEYS.

Patented Nov. 15, 1938

2,137,146

UNITED STATES PATENT OFFICE 2,137,146

METHOD OF FINISHING GEARS

Oliver G. Simmons, Lakewood, Ohio

Application March 7, 1935, Serial No. 9,824

17 Claims. (Cl. 90—2)

This invention relates to a method and apparatus for finishing gears by subjecting the gears to a combined burnishing and shaving operation.

An object of the invention is to provide an improved and novel method and apparatus for finishing gears with a high degree of accuracy and the desired surface smoothness, compactness and finish.

Another object is to provide an improved and novel method and apparatus for finishing gears quickly and economically and with a high degree of accuracy and the desired surface smoothness, compactness and finish.

Another object is to provide an improved and novel method and apparatus for finishing gears quickly and economically and with a high degree of accuracy and the desired surface smoothness, compactness and finish, by means of a combined burnishing and shaving operation.

Another object is to provide an improved and novel method and apparatus for finishing both external and internal gears quickly and economically and with a high degree of accuracy and the desired surface smoothness, compactness and finish by means of a combined and simultaneous burnishing and shaving operation.

A further object is to provide an improved and novel method and apparatus for finishing gears by a combined burnishing and shaving action, which quickly, economically and by means of a single operation, refines the gear teeth to a high degree of accuracy, while simultaneously burnishing the working face surfaces of the teeth.

A further object is to provide a method and apparatus for finishing gears by a combined and simultaneous burnishing and shaving action, wherein there is imparted to the tools or cutters and to the work gears only a relative movement of rotation in addition to a radial pressure feed movement.

Another object is to provide a method of simultaneously shaving and burnishing gears wherein the burnishing pressures usually required are substantially decreased.

Another object is to provide means for finishing gears by a combined burnishing and shaving action, which is of such character that the ordinary burnishing machines now in commercial use can be used therefor, or by means of a simple apparatus or attachment, a conventional milling machine, lathe or other machine tool may also be used therefor.

A further object is to provide a method for finishing gears by a combined burnishing and shaving action, which does not require in its practice expensive special machines.

Another object is to provide an improved tool or cutter in the form of a gear for simultaneously burnishing and shaving gears to finish the gears quickly, economically and with a high degree of accuracy and the desired surface smoothness, compactness and finish.

Further and additional objects and advantages residing in the invention will become apparent during the detailed description that is to follow of several embodiments of the invention.

Referring to the accompanying drawings.

The present requirement for gears of high accuracy and finish, especially gears which are to be used in motor vehicles, has necessitated further finishing operations upon the gears after they have been cut.

This further finishing of the gears has been carried out heretofore by means of a number of separate operations, namely, by a shaving operation to remove and correct irregularities and errors in the gear teeth occasioned by inaccurate cutting of the gears, and by a separate burnishing operation to compact, smooth and polish the working face surfaces of the gear teeth.

It will be evident that the practice involving separate shaving and burnishing operations is necessarily slow and uneconomical.

Machines have been produced and are now being used for the purpose of subjecting the gears to the shaving operation referred to. However, generally these machines impart to the work gears and to the tools or cutters compounded relative movements, usually consisting of relatively rotating the work gears and cutters in mesh, and at the same time imparting to the cutters and work gears relative lateral and linear movements to produce the shaving action of the cutters upon the work gears.

These special machines, because of the compounded movements which they must impart to the cutters and work gears, are relatively complicated and expensive in view of the single purpose for which they are used, and, in addition, they are relatively slow in operation.

Certain of the machines referred to are constructed so that the axes of the cutter and work gear are arranged in non-parallel relationship, wherefore the cutter has merely a tangential point contact with the work gear. It is necessary in such machines to impart long relative linear and lateral movements to the cutter and gear axially of the latter to cause the cutter to contact the gear from end to end to cut cylindrical surfaces thereon.

Such machines are not adapted to operate upon internal gears because of the necessary lateral and linear movements of the cutter completely across the face of the gears, since the attaching flanges of the internal gears and the supports to which the flanges must be connected, restrict the operating space within the internal gears and interfere with the compounded relative rotative and long lateral and linear movements between the cutters and the work gears. The same condition exists in connection with gears formed on spline shafts, because the flanges or shoulders on the shafts adjacent to the gears interfere and prohibit the imparting to the cutters and work gears the compounded relative movements referred to. Likewise, the shaving of the gears of cluster gears could not be carried out on these machines for the same reasons.

As previously stated heretofore, the shaving operation must be followed by a separate burnishing operation, which not only increases the time and cost of finishing the gears, but requires separate burnishing apparatus therefor.

It is desired by means of the present invention to provide a method and apparatus for finishing both external and internal gears, as well as cluster gears and gears on spline shafts, to a high degree of accuracy, smoothness, compactness and finish, quickly and economically by means of a single operation, and wherein the use of special machines is eliminated, since there are no compounded relative movements to be imparted to the cutters and work gears during the operation, but only a movement of rotation in addition to a radial pressure feed movement.

In attaining the ends sought the present invention contemplates the provision of combined burnishing and shaving cutters in the form of gears which, when merely rotated in mesh with the work gears while being given a suitable pressure feed movement, will shave and burnish simultaneously the complete working face surfaces of the teeth of the work gears from end to end thereof and with a high degree of accuracy, smoothness, compactness and finish, irrespective of the degree of error of spacing or tooth form in the work gears after they have been cut.

More specifically the invention contemplates burnishing and shaving cutters in the form of straight tooth, helical tooth or other types of gears corresponding to the types of the work gears with which they are used and provided around their circumferences with a multiplicity of helical grooves extending from end to end of the cutters in an axial direction and completely through the teeth thereof from the outside diameters of the cutters to the roots of the teeth, whereby the teeth of the cutters are provided with a multiplicity of cutting edges which act when the cutters are rotated under pressure in mesh with the work gears to shave the complete working face surfaces of the teeth of the work gears from end to end of the gears, while the working face surfaces of the teeth of the cutters between the helical grooves act to simultaneously burnish the working face surfaces of the teeth of the work gears. The multiplicity of circumferential grooves may be either in the form of a plurality of separate helical grooves, or in the form of a single helical groove of small lead and many spires.

Since the cutters are provided with a plurality or multiplicity of such circumferential helical grooves, the shaving bites or cuts taken in the work gears by the large number of cutting edges formed by the helical grooves will overlap, and because of the lead of the helical grooves will migrate from end to end of the working face surfaces of the teeth of the work gears.

In view of the fact that the cutters are provided with a plurality of circumferential helical grooves having a lead axially of the cutters and extending completely through the teeth thereof from the outside diameters of the cutters to the roots of the teeth, only a relative rotative movement in addition to a radial pressure feed movement need be imparted to the cutters and work gears to effect the simultaneous shaving and burnishing of the entire working face surfaces of the teeth of the work gears from end to end of the gears, and hence it is unnecessary to use complicated machines capable of imparting compounded relative lateral, linear and rotational movements to the cutters and work gears.

As previously stated, the invention may be practiced upon the usual burnishing machine, wherein the work gear and the burnishing gears are simply rotated in mesh, under pressure, or it may be practiced by means of simple attachments which can be mounted upon the ordinary milling machine, lathe or other machine tool.

In describing the invention in detail and the various embodiments which may be employed in practicing it, reference will first be made to Figs. 1 to 4 inclusive of the drawings, wherein an external helical work gear is shown being simultaneously shaved and burnished by means of a plurality of helical cutters.

Figure 1:
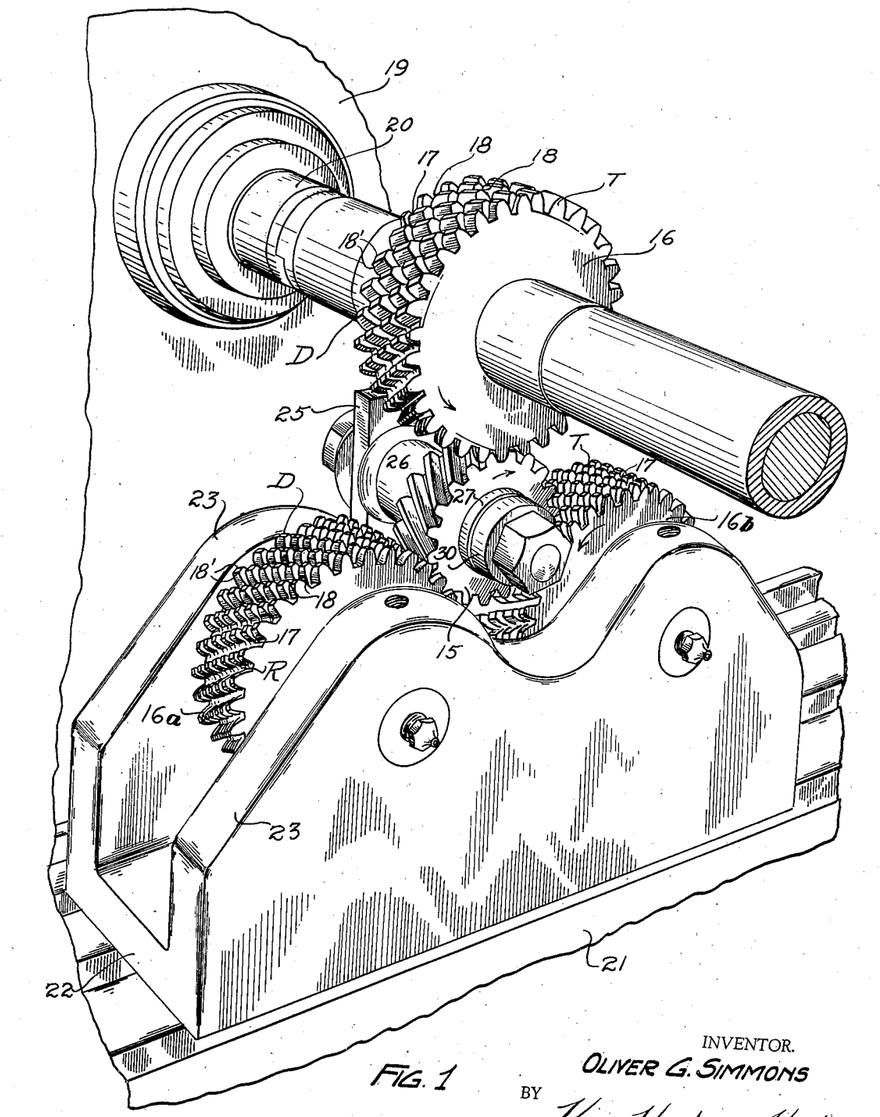
Fig. 1 is a perspective view of a form of apparatus which may be used to practice the present invention, and shows an attachment which may be mounted upon the table of a conventional milling machine and which carries two of the tools or cutters and the work gear, while a third tool or cutter is mounted upon the spindle of the machine, the cutters and work gear in this instance being shown as helical gears.
Figure 2:
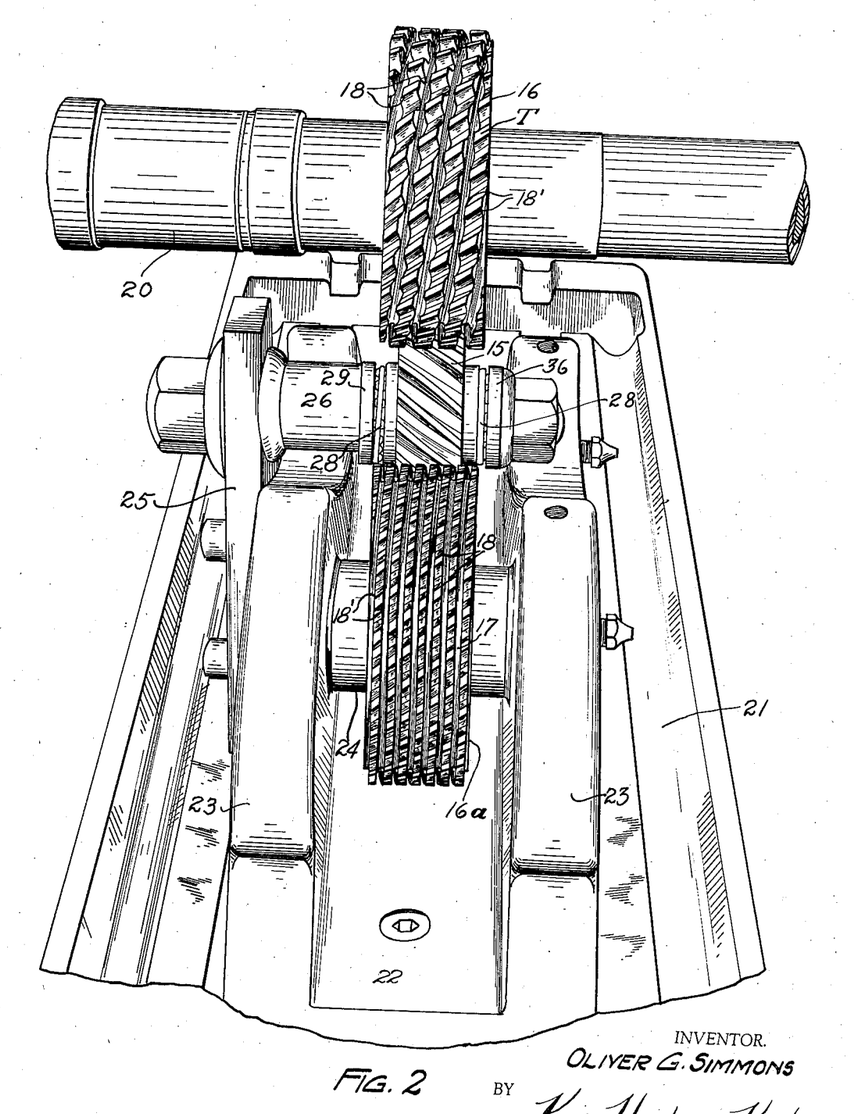
Fig. 2 is a side elevational view of Fig. 1
Figure 3:
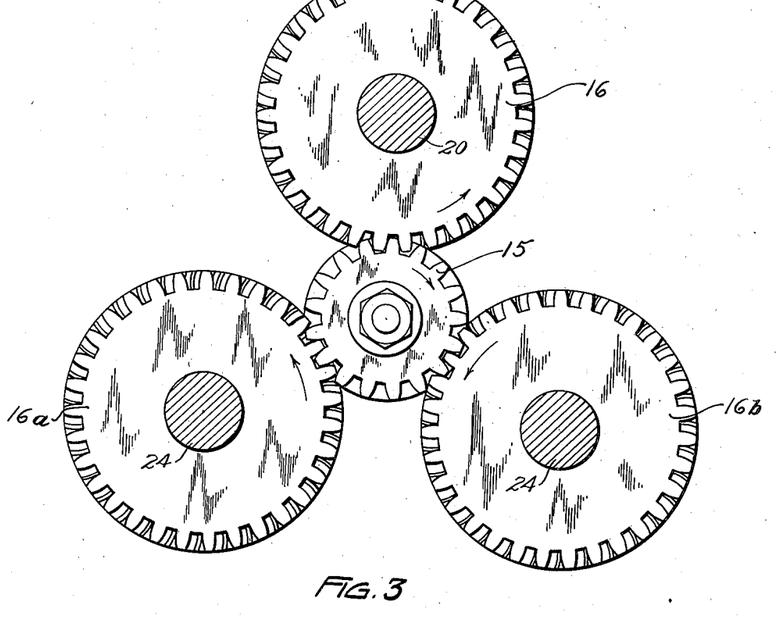
Fig. 3 is a detached and elevational view of the cutters and work gear shown in Figs. 1 and 2 with the shafts supporting the cutters shown in section.
Figure 4:
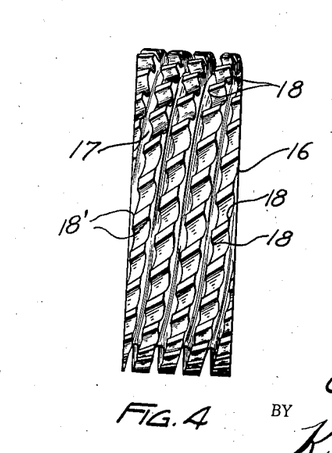
Fig. 4 is a side elevational view of one of the cutters shown in Figs. 1 to 3.

The helical work gear indicated at 15, may be of either hand, any desired angle of helix, normal diametral pitch, normal pressure angle and number of teeth.

The tools or cutters indicated at 16, 16a and 16b are helical gears of the opposite hand from the work gear 15, but are of the same angle of helix, normal diametral pitch and normal pressure angle as the work gear.

Although the cutters may be of the same size and number of teeth as the work gear, it is preferable to employ cutters which are of larger size and greater number of teeth than the work gear because of the better results thus obtained, due to the greater number of cutting edges, the increased burnishing and peripheral surfaces, and the longer wearing qualities of the cutters. Consequently the work gear 15 has been illustrated herein as of smaller size and lesser number of teeth than the cutters 16, 16a and 16b, it being noted that the cutters themselves are shown, by way of example, all as of the same size and number of teeth.

As previously stated, the cutters employed in practicing the invention are provided with a plurality or multiplicity of circumferential helical grooves extending from end to end of the cutters in an axial direction and completely through the teeth thereof from the outside diameters of the cutters to the roots of the teeth.

In the instances wherein a plurality of cutters are employed to simultaneously shave and burnish the work gears, various cutters may be provided with different numbers of circumferential helical grooves, or all of the cutters may be provided with the same number of circumferential helical grooves of the same lead. The circumferential helical grooves may be of the same hand as the helical cutters or of opposite hand, although it is preferable that the grooves be of the same hand as the cutters since the cutting edges thus provided by the grooves are more acute and, hence, have better cutting action.

In Figs. 1 to 4 inclusive it will be noted that certain of the cutters 16, 16a and 16b are shown as provided with a different number of circumferential helical grooves 17 of different lead than is the case with other of the cutters, as, for example, the cutter 16 is provided with only 4 circumferential helical grooves 17, while the cutter 16a is illustrated as having seven of the grooves 17 formed therein. It will be understood, however, that the showing of Figs. 1 to 4 inclusive is only by way of example, and that the cutters 16, 16a and 16b could, and preferably in practice, would be provided with the same number of circumferential helical grooves 17 of the same hand.

The circumferential helical grooves 17 preferably should extend from end to end of the cutters in an axial direction and should be of such lead that a plurality or multiplicity of the grooves are provided, whereby a great number of cutting edges 18 and 18' are formed on both of the working face surfaces of each of the teeth of the cutters. The number of cutting edges 18 and 18' provided on the cutters by the circumferential helical grooves 17 results, when the cutters are rotated in mesh with the work gears, under pressure, in having the shaving cuts or bites taken in the working face surfaces of the teeth of the work gears overlap and migrate from end to end of the work gears, as will be more clearly explained in connection with the schematic showing of Figs. 12 and 13. The large number or multiplicity of cutting or shaving edges 18 and 18' on the cutters reduces the cutting or shaving force which must be applied to the cutters in shaving the work gear and enables the cutters to be used upon conventional burnishing machines or upon attachments mounted on conventional machine tools.

As previously stated, the grooves 17 extend completely through the teeth T from the outside diameters D of the cutters to the roots R of the teeth. The teeth T of the cutters are divided by the helical grooves 17 from end to end of the cutters into a plurality of separate small cutting and burnishing teeth, each of which has two acute shaving or cutting edges 18 and two obtuse shaving or cutting edges 18'. The working face surfaces of the teeth T between the grooves 17 form a plurality of burnishing surfaces which, when the cutters are rotated in mesh with the work gear under pressure, act to burnish the working face surfaces of the teeth of the work gear from end to end of the gear simultaneously as they are being shaved.

It will be understood that in employing the cutters 16, 16a and 16b to shave and burnish the teeth of the work gear 15, that the cutters are so arranged as to intermesh under pressure with the work gear in a manner similar to that followed upon the usual burnishing machine employing a plurality of burnishing gears in its operation. It should be understood, of course, that the invention could be practiced by means of a single cutter, rotating in mesh under pressure with the work gear, but inasmuch as such an arrangement is not as effective as using a plurality of cutters, with the consequent increase in the number of cutting or shaving edges and burnishing surfaces, it is preferable to follow the operation illustrated in Figs. 1 to 3 inclusive.

Although the invention can be practiced upon a conventional burnishing machine, Figs. 1 to 3 inclusive illustrate the same as practiced upon a conventional milling machine, wherein an attachment is secured to the table of the machine. In Figs. 1 and 2 a portion of the head 19 of a milling machine is shown with the usual rotatable spindle 20 extending therefrom. The table of the milling machine is indicated at 21, and the attachment previously referred to is shown secured to the table. The attachment is illustrated as substantially a U-shaped bracket member or support, having its base 22 secured to the table 21 and its arms or legs 23 extending vertically upwardly from the base. The cutters 16a and 16b are journaled in the arms or legs 23 of the attachment on fixed shafts 24 spaced apart at suitable center distances. Secured to the outside of the arm or leg 23 which is adjacent to the head 19, and midway between the opposite ends of the attachment, is an upwardly extending supporting plate 25 which by means of a vertical slot adjustably carries a stub shaft 26 upon which the work gear 15 is loosely mounted for free rotation with radial play but is held against axial movement, that is, the work gear has a floating relationship with respect to the cutters. The work gear 15 is held against substantial endwise or axial movement on the shaft 26 by means of spacer members 28, preferably provided with ball thrust bearings and located between the work gear and a shoulder 29 and clamping collar 30 on the stub shaft 26.

After the attachment has been secured to the table 21 of the milling machine with the cutters 16a and 16b journaled on the shafts 24, the work gear 15 is mounted on the stub shaft 26 and the latter adjusted to bring the work gear into close intermeshing relationship with respect to the cutters 16a and 16b. The attachment has been so located upon the table 21 that the shaft 26 is directly below the spindle 20 of the milling machine, which, as has been previously stated, has the cutter 16 secured thereto. The table 21 is now raised vertically by means of the usual mechanism upon a machine of this type, until the work gear 15 has been brought into mesh with the cutter 16. At this time the machine is operated to rotate the spindle 20, whereupon the cutter 16 rotates the work gear 15 which, in turn, acts as a floating idler gear to rotate the cutters 16a and 16b. The spindle 20 is rotated for a suitable period of time, first in one direction and then in the opposite direction, and a pressure feed movement is given to the cutters and work gear, as desired, by gradually elevating the table 21 until the work gear has been finished to the required dimensions and to the desired high degree of accuracy and the desired smoothness and compactness imparted to the working face surfaces of its teeth from end to end of the work gear.

It will be understood that the rotation of the cutters in mesh with the floating work gear causes the large number of cutting edges 18 formed by the plurality of circumferential helical grooves 17 to take small cuts or shaving bites in the working face surfaces of the teeth of the work gear, which cuts or shaving bites, due to the great number of cutting or shaving edges, overlap and migrate in an axial direction from end to end of the work gear. Inasmuch as the shaving bites or cuts taken by the cutting edges 18 and 18' are each exceedingly small, the chips being like powder or the filings from a fine file, wherefore only relatively small pressures are required, the spindle may be rotated at high speeds of rotation, since relatively small torque is required to cause the cutters to perform their cutting or shaving action upon the teeth of the work gear. Also, during the rotation of the cutters in mesh with the work gear under pressure, the working face surfaces of the teeth T between the grooves 17 rolling in mesh with the working face surfaces of the teeth of the work gear, act to burnish the latter and to provide the desired smoothness, compactness and finish thereon. It has been found that, due to the combined shaving and burnishing action, the teeth of the work gear are compacted and smoothed with less pressure than is required where a burnishing action only takes place.

It will be understood that although the cutters are made as identical as it is possible to make them, nevertheless there is a possibility that the three cutters will have slight variations. Hence, it is desirable that the work gear run in floating intermeshing relationship with the cutters so that whatever differences there may be in the cutters will be compensated for, and when the work gear is finished, it will have a composite tooth outline conjugate to all of the cutters. The work gears finished by the same set of cutters will not only each mesh with and be conjugate to all of the cutters, but every one of the work gears so finished will be conjugate to and mesh with each of the other work gears finished by the same cutters or by any other similar set of cutters of the same pitch and tooth characteristics. The term "floating" as used herein means that the work gear has relative radial movement with respect to the cutters and this can be effected either by arranging the work gear loosely on its shaft as illustrated and described herein, or by so mounting the supporting shaft for the work gear that the shaft with the work gear thereon will have a floating movement, or by mounting the cutters so that they will have a radial movement with respect to the work gear.

The simultaneous shaving and burnishing of the work gear to the desired high degree of accuracy and smoothness and compactness of the teeth surfaces is, due to the multiplicity of cutting edges 18 and 18' and the high speeds of rotation of the cutters and work gear, accomplished in a very short time, and particularly is this so where a plurality of cutters are used, such as shown in Figs. 1 to 3.

Figure 5:
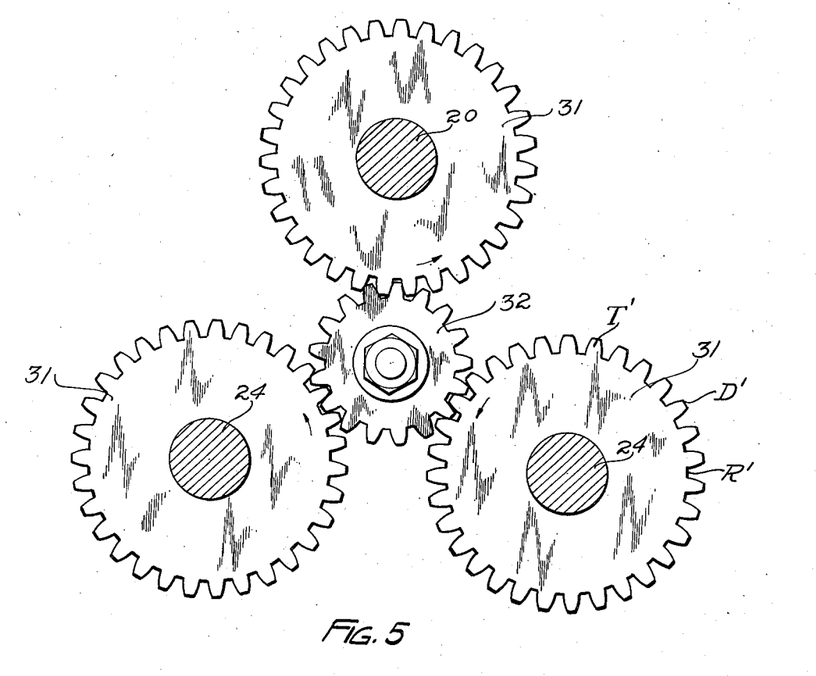
Fig. 5 is a view similar to Fig. 3, but illustrates spur tools or cutters and a spur work gear instead of the helical cutters and helical work gear shown in the previous views.

In Fig. 5 there is shown in end elevation a plurality of spur cutters 31, arranged in intermeshing engagement with a spur work gear 32, with the uppermost cutter 31 mounted on the spindle 20 of the milling machine, and the other two cutters mounted on the shafts 24 of the attachment described in connection with Figs. 1 to 3. The spur work gear 32 is, of course, mounted on the stub shaft 26 of the attachment in the same way as was the work gear 15 previously described.

It will be understood that the spur cutters 31 are of the same pressure angle as the spur work gear 32, but that preferably the number of teeth T' of the cutters is greater than the number of the teeth of the work gear.

Figure 6:
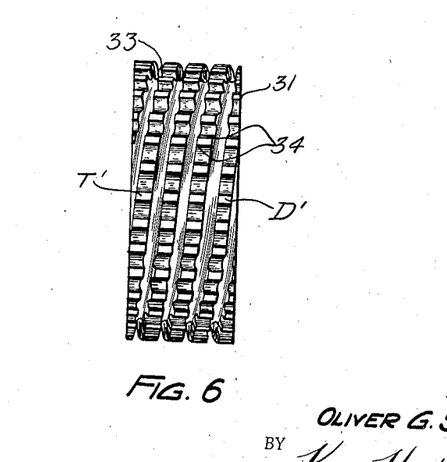
Fig. 6 is a side elevational view of one of the spur cutters shown in Fig. 5.

The cutters 31, as shown in Fig. 6, are provided with a plurality of circumferential helical grooves 33 extending from end to end of the cutter in an axial direction and completely through the teeth T' from the outside diameter D' of the cutter to the roots R' of the teeth. As stated in connection with the circumferential helical grooves 17 in the helical cutters 16, 16a and 16b, the number, hand and lead of the helical grooves 30 may be different in the different cutters 31, or all of the cutters 31 may be provided with the same number of helical grooves 33 of the same hand. The helical grooves 33 separate the teeth T' of the cutters 31 from end to end of the cutters into a plurality of relatively small cutting teeth, each of which has two acute cutting or shaving edges 34, and two obtuse cutting or shaving edges 34', while the working face surfaces of the small cutting teeth form burnishing surfaces which act to burnish the working face surfaces of the teeth of the work gear 32.

It will be evident that when the cutters 31 are rotated in mesh under pressure with the work gear 32 the cutting edges 34 take a great number of small cuts or shaving bites in the teeth of the work gear 32, and that such bites or cuts migrate, due to the lead of the helical grooves 33, from end to end of the work gear 32 and are in overlapping relationship with each other. In other words, the shaving and burnishing action of the spur cutters 31 upon the teeth of the work 32 is the same in character as the shaving and burnishing action of the helical cutters 16, 16a and 16b upon the helical work gear 15, as previously described.

As previously stated the present invention may be effectively practiced in the finishing of internal gears and the gears of spline shafts, since in addition to the radial pressure feed movement, only a rotative movement need be given the cutters and work gear. In the shaving machines, heretofore referred to, wherein the axes of the cutters and work gear are arranged non-parallel and the cutters must be given a lateral movement in a direction axially of the work gear completely across the face of the latter, it has been found impossible to operate upon gears of internal type or upon spline shaft gears because of the compounded relative rotative lateral and linear movements imparted to the cutters and work gears in the operation of such machines.

Figure 7:
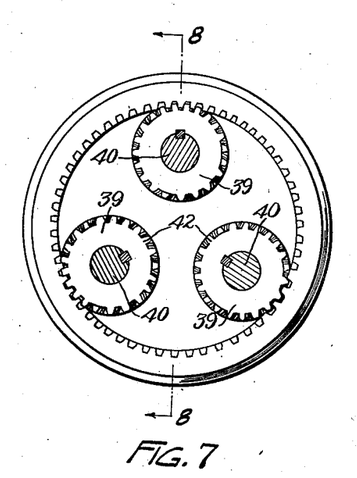
Fig. 7 is an end view similar to Figs. 3 and 5, but shows a plurality of helical cutters or tools operating upon an internal helical gear having an inwardly extending attaching flange.
Figure 8:
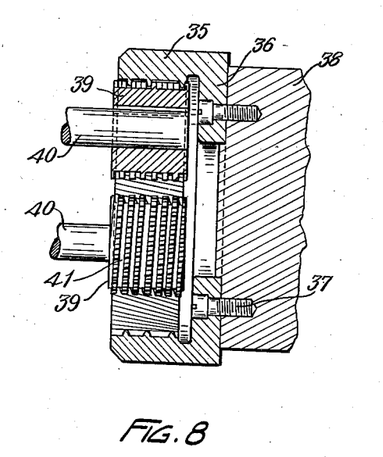
Fig. 8 is a sectional view taken substantially on line 8—8 of Fig. 7 looking in the direction of the arrows.

In Figs. 7 and 8 there is shown an internal helical gear with an inwardly extending attaching flange, and said gear is being shaved and burnished by means of three helical cutters similar to the cutters 16, 16a and 16b shown in Figs. 1 to 4 inclusive.

The internal helical gear 35 has an inwardly extending attaching flange 36 as is common in internal gears, and this flange 36 can be conveniently secured by attaching bolts 37 to a block or adapter 38 mounted in the usual chuck on the spindle in the head of a conventional lathe; the chuck, spindle and other portions of the lathe not being shown inasmuch as they are well known in the art.

The helical cutters 39 may be keyed to rotatable shafts 40, suitably mounted for adjustment radially of the internal gear 35 for pressure feed in an attachment (not shown) which may be secured to the compound slide or some other suitable part of the lathe.

It will be understood that the attachment referred to and the compound slide or other part to which it is secured are moved by the usual mechanism for moving the slides of a lathe until the cutters 39 are located within the internal gear 35, after which the slides or other parts carrying the attachment are clamped in position. The shafts 40 are then adjusted radially of the gear 35 by the adjusting means (not shown) provided on the attachment, until the cutters 39 are brought into intermeshing engagement with the internal gear 35.

The spindle of the lathe now being set in operation and the internal gear 35 rotated, it will be seen that the cutters 39 and shafts 40 will be driven by the gear 35, and that the cutters will simultaneously shave and burnish the gear 35 in the same way as the cutters 16, 16a and 16b simultaneously shaved and burnished the gear 15, shown in Figs. 1 to 3 inclusive.

It will be understood that during the shaving and burnishing of the internal gear 35, the shafts 40 and cutters 39 keyed thereto, will be gradually adjusted radially of the gear 35 to increase the pressure between the gear and cutters, and also that the gear 35 will be rotated in opposite direction during portions of the operation.

Although the internal gear 35 and the cutters 39 have been described as mounted upon a lathe for carrying out the shaving and burnishing operation, it will be appreciated that other types of machine tools might be used for this purpose.

As previously stated, it has been impossible to use that type of shaving machine having the axes of the cutter and work gear non-parallel upon internal gears, since the cutter and work gear in the operation of such machines must have combined relative movements, namely, rotative and extended linear and lateral movements, completely across the face of the work gear, wherefore the character of the internal gear itself and the attaching flange thereof form obstructions, preventing the obtainance of these relative movements.

The shaving and burnishing of an internal gear, such as the gear 35 shown in Figs. 7 and 8, can be readily accomplished when performed in accordance with the present invention, since there is only a rotative movement, in addition to a pressure feed movement, between the cutters and work gear and no lateral or linear movements therebetween, consequently, the internal gear and its ataching flange 36, offer no obstruction to the shaving and burnishing operation.

As previously stated, the internal gear 35 and the cutters 39 are helical gears, the cutters 39 being of the opposite hand from the gear 35 but having the same angle of helix, normal diametral pitch and normal pressure angle as the gear 35. In the case of the cutters for shaving and burnishing external gears, the cutters are preferably of larger size and number of teeth than the work gears to provide a greater number of cutting or shaving edges, increased burnishing surfaces, and longer wearing qualities. However, since the arc of contact between an internal gear and its mating gear is larger than the arc of contact between an external gear and its mating gear, much greater pressures would be required in the case of internal gears to perform the same amount of work than would be the case with external gears. Therefore, the cutters are preferably of smaller size and lesser number of teeth than the internal gears, it being noted, however, that preferably the cutters should be of a length somewhat greater from end to end of the cutters than the length of the teeth of the internal gear from end to end, so that the working face surfaces of the teeth of the internal gear will be completely shaved and burnished by the cutters.

The helical cutters 39, similar to the cutters 16, 16a and 16b, are provided with a plurality or multiplicity of circumferential helical grooves 41 extending from end to end of the cutters in an axial direction and completely through the teeth 42 thereof from the outside diameter of the cutters to the roots of the teeth. The multiplicity of circumferential helical grooves 41 divide the teeth 42 of the cutters 39 into a plurality of small cutting teeth, each of which has two acute shaving or cutting edges and two obtuse shaving or cutting edges. As in the previously described forms the rotation of the cutters 39 in mesh under pressure with the teeth of the internal gear 35, causes the large number of cutting or shaving edges on the teeth 42 of the cutters to take small cuts or shaving bites in the work face surfaces of the teeth of the gear, which cuts or bites overlap and migrate from end to end of the teeth of the gear 35, so that the working face surfaces of the teeth will be completely shaved. The working face surfaces of the teeth 42 of the cutters 39 intermediate the circumferential helical grooves 41, act to burnish the working face surfaces of the teeth of the gear 35 simultaneously as they are being shaved as in the previously described forms. The large number of cutting or shaving edges on the cutters 39 lessen the force required to effect the cutting action which enables the cutter and work gear to be rotated at high speeds.

Figures 9, 10:
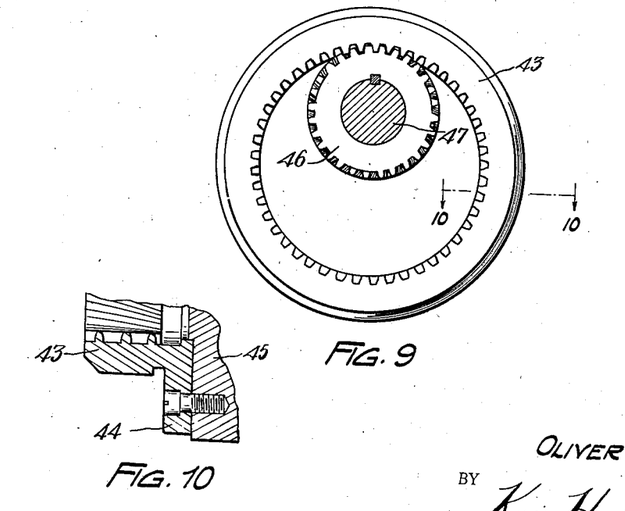
Fig. 9 is a view similar to Fig. 7 and shows a single helical cutter or tool operating upon an internal helical gear having an outwardly extending attaching flange.
Fig. 10 is a detail sectional view taken substantially on line 10—10 of Fig. 9, looking in the direction of the arrows.

In Figs. 9 and 10 there is disclosed an internal helical gear 43, similar to the internal helical gear 35, except that the gear 43 is provided with an outwardly extending attaching flange 44 in place of the inwardly extending attaching flange 36. The attaching flange 44 of the internal gear 43 is secured to a block or adapter 45 similar to the block or adapter 38 shown in Fig. 8, and the adapter 45 can be mounted in the chuck on the spindle of a lathe in the same way as is the adapter 38. It will be noted in Fig. 9 that only one helical cutter 46 is shown, and this cutter is keyed to a shaft 47 which is rotatably carried by an attachment that may be mounted upon the compound slide of the lathe similarly to the shafts 40 described in connection with Figs. 7 and 8. The construction of the cutter 46, the manner in which the cutter and the gear 43 are mounted upon the lathe or other machine tool, and the mode of operating the same to effect the shaving and burnishing operation, are the same as for the gear 35 and the cutters 39 hereinbefore described.

Inasmuch as the simultaneous shaving and burnishing operation requires only a rotative movement of the gear 43 and the cutter 46 in addition to the radial pressure feed movement, it will be seen that the shaving and burnishing operation is not effected by the character of the gear 43, nor does the block or adapter 45 offer any obstruction to imparting the necessary movements of rotation and pressure feed to the gear 43 and cutter 46.

Figure 11:
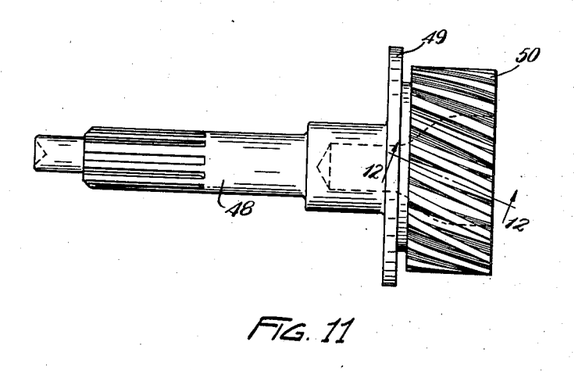
Fig. 11 is a detached elevational view of a transmission spline shaft having thereon a helical gear which may be finished in accordance with the present invention.

In Fig. 11 there is shown a spline shaft 48, having at one end and adjacent to the usual shoulder or flange 49 a helical gear 50. The gear 50 can be simultaneously shaved and burnished by helical cutters similar to the cutters 16, 16a and 16b efficiently and quickly, inasmuch as it is merely necessary to rotate the gear 50 and the cutters in intermeshing relation while imparting a relative radial pressure feed thereto, wherefore the flange or shoulder 49 adjacent to the gear 50 does not interfere with the shaving and burnishing operation.

It will be understood that the gear 50 could be burnished and shaved in accordance with the present invention upon a conventional burnishing machine or machine tool, wherein, by means of an attachment or adapter, the spline shaft 48 could be rotatably supported.

Figure 12:
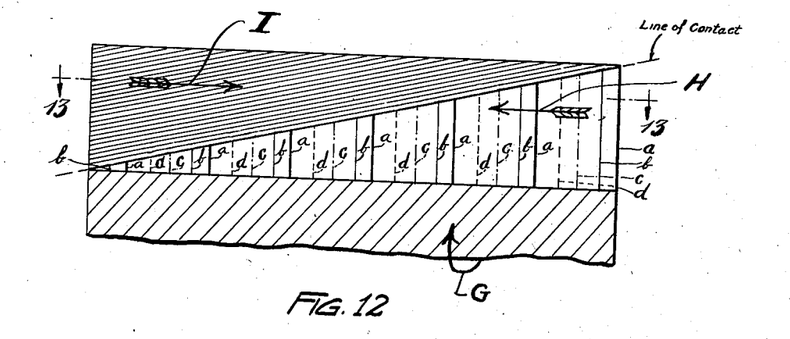
Fig. 12 is a straight sectional view through one of the teeth of the helical gear shown in Fig. 11 and is taken substantially on line 12—12 of Fig. 11, looking in the direction of the arrows, this view being developed into the plane of the paper on an enlarged scale and illustrating schematically the shaving action of the teeth of the cutters upon the teeth of the work gear during the finishing operation and is applicable to all of the forms of cutters illustrated in the previously described views.
Figure 13:
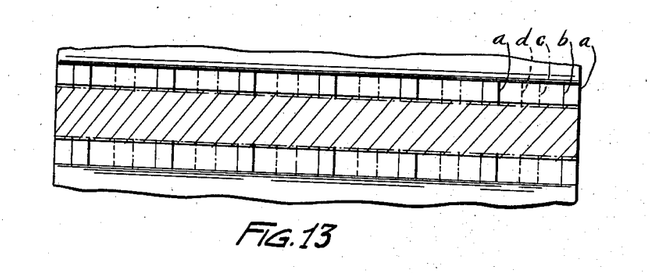
Fig. 13 is a sectional view taken substantially on line 13—13 of Fig. 12 looking in the direction of the arrows.

Figs. 12 and 13 are schematic illustrations of the shaving action of the cutting or shaving edges of the helical cutters hereinbefore described upon the working face surfaces of the teeth of the work gear, and it should be understood that notwithstanding the fact that said Figs. 12 and 13 are sectional views taken through the gear 50 of Fig. 11, that the description with reference to Figs. 12 and 13 is applicable to the manner in which all the helical cutters hereinbefore referred to effect their cutting or shaving action upon the teeth of the work gears upon which they are operating.

Assuming that three helical cutters, such as the cutters 16, 16a and 16b, are used for the simultaneous shaving and burnishing operation and that each cutter has 31 teeth, and, for the purposes of this illustration, seven circumferential helical grooves, it will be seen that each tooth of each cutter is divided by the seven grooves into no less than seven small shaving and burnishing teeth, each of which has two acute and two obtuse cutting or shaving edges. Therefore, since each tooth of each cutter is divided into seven small shaving or burnishing teeth having four cutting edges each, each tooth of the cutter will have twenty-eight cutting edges, and since each cutter has thirty-one teeth it will have a total of 868 shaving or cutting edges, 434 of which are acute and 434 of which are obtuse. The three cutters combined will, of course, have in the aggregate 2604 shaving or cutting edges to act upon the working face surfaces of the teeth of the work gear, assuming that the width of the work gear is such as to be subjected to the action of all of the cutting edges when rotated in mesh with the cutters.

On the basis of the shaving and burnishing operation consuming 12 seconds, and assuming that the driven cutter is rotated at a speed of 400 R. P. M., it will be obvious that the driven cutter will during the twelve seconds required for the shaving and burnishing operation, make eighty complete revolutions in mesh with the work gear, and that the three cutters since they have an equal number of teeth, will make combined 240 complete revolutions in mesh with the work gear.

In view of the multiplicity of cutting or shaving edges on each cutter and the aggregate large number of the cutting or shaving edges on the three cutters, it will readily be seen that the working face surfaces of the teeth of the work gear are subjected to a great multiplicity of cutting or shaving bites when the work gear is run in mesh with the cutters and under pressure during the shaving or burnishing operation.

Fig. 12 is a view of the working face surface on one side of one of the teeth of a right hand helical gear, such as the gear 50, developed into a plane, to illustrate the action of the cutting or shaving edges of left hand cutters having right hand helical circumferential grooves thereupon, the gear rolling in mesh with the cutters in the direction of the arrow G.

In Fig. 12 the heavy lines a represent the cuts taken in the working face surface of the tooth by the acute cutting edges on one side of one tooth of one of the cutters, and since there are seven of such acute cutting or shaving edges, according to the example given, there will be seven cuts taken by such acute cutting edges in the working face surface of the tooth as represented by the lines $a$.

Starting at the right hand side, as viewed in Fig. 12, the first acute cutting edge will effect a cut in the working face surface of the tooth substantially from the outer diameter of the gear to the dedendum circle of the tooth as it is rolled in the direction of the arrow G, while the successive acute cutting edges on the one side of the one tooth of the cutter, due to the lead and left hand of the helical grooves, will take cuts equally spaced toward the left (as viewed in the drawings) and extending substantially from the line of contact between the cutter tooth and gear tooth to the dedendum circle of the tooth as clearly shown by the lines $a$ in Fig. 12. The term dedendum circle is used herein with reference to those instances wherein the dedendum circle is coincident with or of greater diameter than the base circle of the gear, it being understood that in no instance would the cutting action go below the base circle of the gear. In other words, the cutting action extends from the outer diameter of the gear inwardly of the complete working face surface of the tooth. When another tooth of the cutter comes in contact with the working face surface of the tooth of the gear, the seven acute cutting edges on one side of this new tooth of the cutter will take shaving cuts or bites in the working face surface of the gear tooth, as represented by the lines $b$ in Fig. 12.

It will be noted that the first acute cutting edge of the second or new tooth of the cutter will engage the surface of the gear tooth to the left of the first line $a$, due to the lead and left hand of the circumferential helical grooves, and will cut substantially from the line of contact to the dedendum circle of the gear tooth, as represented by the right hand line $b$, while the following cuts taken by the acute cutting edges of the new or second tooth of the cutter, as represented by the other lines $b$, will all be to the left of the other lines $a$, respectively, with the lines $b$, or the cuts represented thereby, extending from the line of contact to the dedendum circle.

As different teeth of the cutter come into contact with the working face surface of the gear tooth, successive cuts will be taken by the acute cutting edges on one side of each of the different cutter teeth, such cuts or bites being represented by the lines $c$ and $d$ and being located to the left of the different lines $a$ and $b$, due to the lead and left hand of the circumferential helical grooves, and extending from the line of contact to the dedendum circle.

As the gear rotates in mesh with the cutter during the shaving and burnishing operation the cuts will migrate completely across the working face surface of the tooth of the gear from one end thereof to the opposite end, and from the outer diameter of the gear substantially to the dedendum circle of the tooth, that is, the cuts will extend the full length of the working surface of the gear tooth from end to end of the gear. When the cutter and gear are rotated in the opposite direction from that just described and indicated by the arrow G in Fig. 12, the cut taken by the cutting edges in the working face surface of the tooth of the gear as represented by the lines $a$, $b$, $c$, and $d$, instead of migrating in the direction indicated by the arrow H, will migrate from the left hand side in the direction indicated by the arrow I and will extend from the line of contact toward the outer diameter of the tooth, and will cover the shaded portion of the tooth as shown in Fig. 12, in the same manner as the previously described cuts cover and migate across the unshaded portion. It will be understood that as the tooth of the cutter goes into mesh with the tooth of the gear that the cutting action is below the line of contact and extends from said line downwardly to the dedendum circle, while when the cutter tooth is leaving or going out of mesh with the tooth of the gear, the cutting action is above the line of contact and extends from said line outwardly to the outer diameter of the tooth of the gear.

Since the distance between adjacent lines $a$ represents the distance between the cuts taken in the working face surface of the gear tooth by the successive acute cutting edges on one side of one tooth of the cutter (the first cutter tooth referred to above), it will be seen that after the thirty-one teeth of the cutter all have come into contact with the working face surface of the gear tooth, the acute cutting edges on one side of the cutter teeth, due to the lead of the circumferential helical grooves, will have taken thirty-one cuts in the working face surface of the gear tooth in each of the spaces included by adjacent lines $a$.

Inasmuch as there are seven circumferential helical grooves in the cutter and seven acute cutting edges on each side of each cutter tooth and thus seven spaces included by adjacent lines $a$, it will be seen that after all thirty-one of the cutter teeth have come into contact with the working face surface of the gear tooth, there will have been taken in such surface by the acute cutting edges on one side of the cutter teeth a total of 217 cuts extending from end to end of the gear and over its entire working face surface.

However, when three cutters, each having thirty-one teeth and seven circumferential helical grooves, are employed in the shaving and burnishing operation, there will be a total of 651 acute cutting edges acting to cut the working face surface of the gear tooth, so that after all ninety-three teeth of the three cutters have come into contact with the gear tooth, 651 cuts will have been taken in its entire working face surface from end to end of the gear.

Since the cutter teeth have on each side a number of obtuse cutting edges equal to the number of acute cutting edges on each side and these obtuse edges also perform a shaving action on the gear teeth, it will be seen that acute and obtuse cutting edges on one side of the teeth of the cutters will, combined, take 1302 cuts during the period referred to upon the entire working face surface of the gear tooth and that the cuts will extend from end to end of the gear.

It will be understood that as the gear and cutters are rapidly rotated in mesh during the shaving and burnishing operation, all of the cutter teeth will come into contact with the gear tooth a number of times and hence the 1302 cuts above referred to, will be multiplied accordingly.

It will also be understood that as the cutting edges on one side of a tooth of the cutter are cutting downwardly on the working face surface on one side of the gear tooth, the cutting edges on the adjacent side of the next tooth of the cutter are cutting in an upward direction on the working face surface of the other side of the same gear tooth.

Fig. 13 illustrates schematically the condition just referred to, and shows the cuts as represented by the lines $a$, $b$, $c$ and $d$ on each working face surface of the gear tooth, the cuts in one instance starting at the line of contact and going toward the dedendum circle of the tooth, and in the other instance starting at the dedendum circle of the tooth and traveling toward the line of contact of the gear.

The example briefly described in connection with Figs. 12 and 13 while referring to helical cutters and helical gears, applies also with respect to spur gears and spur cutters, except that since the teeth of such gears or cutters are straight as distinguished from helical, all of the cutting edges on each cutter tooth will act on the working face surface of the gear tooth, from the outer diameter of the gear to the dedendum circle of the tooth, because the line of contact between the teeth of spur gears is straight, that is, it is parallel to the axis of the gear.

The cutting and burnishing action of the teeth of the cutters upon the working face surfaces of the work gears will be further explained in connection with Figs. 14 to 20, inclusive of the drawings.

Figure 14:
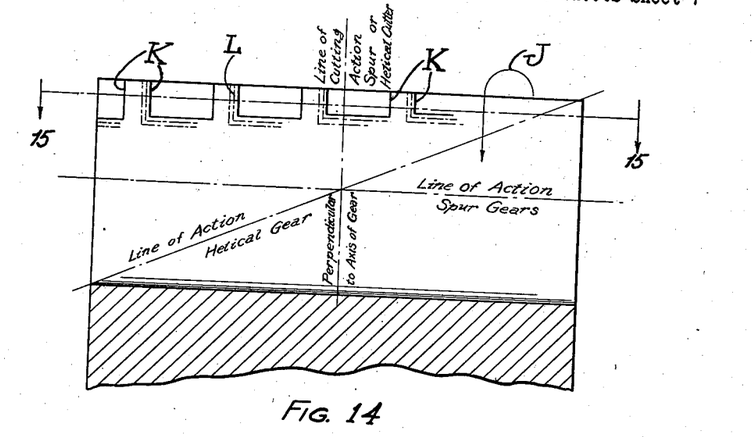
Fig. 14 is a developed sectional view through one of the teeth of a left hand helical gear and illustrates the cutting and burnishing action of the teeth of a right hand helical cutter provided with left hand helical grooves rolling in mesh with the gear, the latter rolling in the direction of the arrow.

Fig. 14 is a developed sectional view showing the working face surface on one side of one tooth of a left hand helical gear rotating in the direction of the arrow J, and upon which is diagrammatically illustrated in an exaggerated manner the cutting action of the teeth of a right hand helical cutter having left hand helical circumferential grooves as it is rolling out of mesh with the gear under pressure. As previously stated, the cutting action of the teeth of the cutter will take place along lines of cutting action which are substantially perpendicular to the axis of the gear and which, as the teeth of the cutter rolls out of mesh with the teeth of the gear, extend from the line of action or contact between the teeth of the cutter and gear outwardly toward the outer diameter of the gear.

Inasmuch as the cutter in the present instance is provided with left hand helical grooves and the gear is rotated in the direction of the arrow J, the shaving or cutting bites taken in the working face surface of the tooth of the gear by the cutting edges on the teeth of the cutter will migrate from right to left; that is, each successive tooth of the cutter as it comes into contact with the working face surface of the gear tooth will cut at a point further to the left than the cut of the preceding cutter tooth. As the cutter and gear rotate in mesh under pressure, the burnishing lands on the first tooth of the cutter which engages the working face surface of the tooth of the gear compress the metal of the gear tooth in zones bounded by the letter K in Fig. 14; while the cutting edges on the tooth of the cutter shear the metal of the gear tooth along the vertical lines K as viewed in the drawings, then as another tooth of the cutter rolls into mesh with the working face surface of the tooth of the gear, the cutting edges of the second tooth shear the metal of the gear tooth along the dot-dash vertical lines L as viewed in the drawings, and to the left of the lines K. As the cutter continues to rotate in mesh with the gear, the cutting edges on successive teeth of the cutter will continue to shear the metal of the gear tooth along lines migrating toward the left and extending toward or from, as the case may be, the line of action or contact between the cutter tooth and the gear tooth until chips have been sheared by the cutting edges from the entire working face surface of the gear tooth and such surface has been compressed or burnished by the burnishing lands on the cutter teeth.

The cutting action of the cutting edges of the teeth of the cutter can be compared to the cutting action which would take place when a knife edge is brought into contact with a surface under pressure and successively moved with small increments of advance in a predetermined direction with the engagement between the knife edge and the surface likened to a series of shearing chops. Another explanation of the cutting action can be by comparison with the action of a paper cutter employing a long knife edge carried by a pivoted member, wherein the knife edge is rapidly brought into shearing cutting engagement with the work while the latter is moved lineally with small increments of movement.

Figure 15:
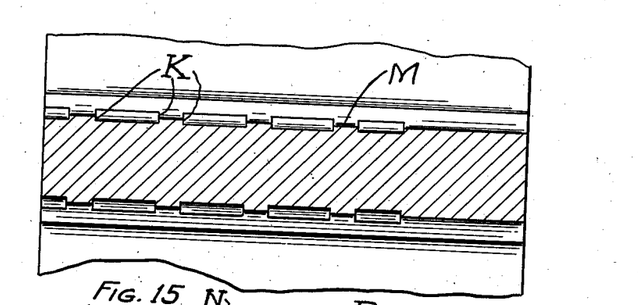
Fig. 15 is a sectional view taken substantially on line 15—15 of Fig. 14, looking in the direction of the arrows.

In Fig. 15, the portions of the working face surface of the gear tooth which are compressed and sheared by the burnishing lands and cutting edges, respectively, of the first cutter tooth and defined by the letter K in Fig. 14, are similarly designated in Fig. 15, the portions between the compressed portions just referred to being indicated by the letter M. As the shearing or cutting action of the cutting edges of the teeth of the cutter migrates across the gear tooth toward the left, such cutting edges will successively take off small chips from the right hand side of the portions M toward the left of said portions until said portions have been completely sheared away and are in line with the portions defined by the letters K, after which if the rotation of the cutter and gear is continued under pressure, the action just referred to will be successively repeated and will continue until the pressure is released.

Figure 16:
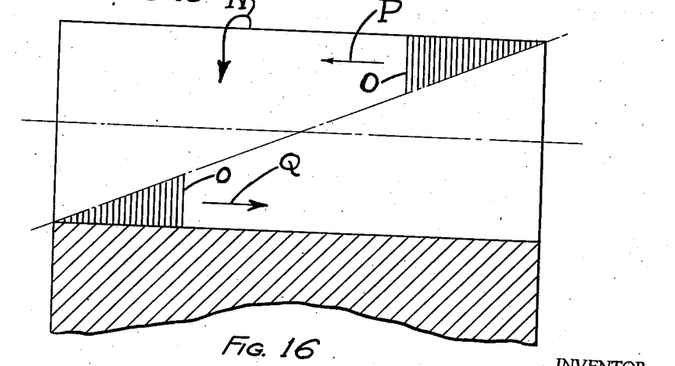
Fig. 16 is a developed sectional view showing the working face surface on one side of one tooth of a right hand helical gear, the cutting action of a left hand helical cutter having left hand helical grooves rolling in mesh with the gear when the latter is turning in the direction of the arrow being indicated diagrammatically by a plurality of straight lines.
Figure 17:
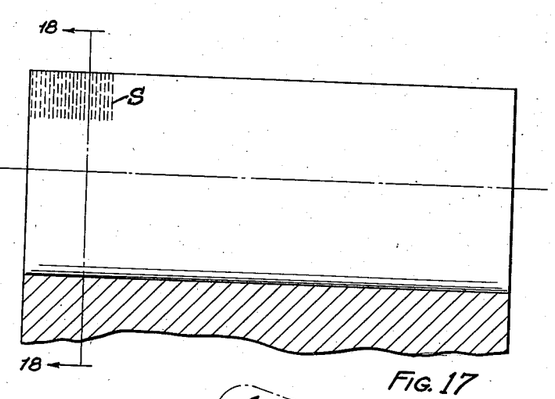
Fig. 17 is a view similar to Fig. 16, but illustrates the working face surface of the tooth of a spur gear rolling in mesh with a spur cutter.

In Fig. 16, which is a developed sectional view of the working face surface of a tooth of the right hand helical gear rotating in the direction fo the arrow N and in mesh with the left hand helical cutter having left hand helical circumferential grooves, the cutting action of the cutting edges of the cutter teeth is designated by the lines O, and it will be seen that as the cutter teeth are rolling out of mesh with the gear tooth, the cutting action of the cutting edges will extend from the line of contact outwardly toward the outer diameter of the gear tooth and will migrate from right to left as indicated by the arrow P; while such cutting action, as the teeth of the cutter come into mesh with the gear tooth, will extend from the line of contact to the dedendum circle and migrate from left to right, as indicated by the arrow Q. It will be noted that the lines of cutting action, as illustrated in Fig. 16, are just reversed in the direction of migration and with respect to the lines of contact to the lines of cutting action illustrated in Fig. 15, from whence it will be seen that the direction of rotation of the gear and cutter and the hand thereof, together with the hand of the helical circumferential grooves in the cutter, determine the direction of migration of the cutting action and the relationship thereof with respect to the line of contact. The lines of cutting action taking place between the teeth of a spur cutter and a spur gear are represented by the lines S in Fig. 17, and it will be noted that such lines as illustrated, extend substantially perpendicular to the axis of the gear and at right angles to the line of contact, and depending upon the direction of rotation of the cutter and gear, will travel from the outer diameter of the gear to the dedendum circle, or from the dedendum circle to the outer diameter of the gear as the teeth of the cutter roll into or out of mesh with the gear tooth. It will be understood, however, that the lines of cutting action are not always perpendicular to the line of contact or to the axis of the gear since it depends upon whether or not the cutting edges of the cutter are perpendicular to the axis, or are so formed as to extend at an angle other than a right angle to the axis.

Reference to Fig. 6 of the drawings will indicate a condition wherein the cutting edges of a spur cutter are not perpendicular to the axis of the cutter, and the lines of cutting action resulting from the use of the cutter shown in Fig. 6, will consequently not be perpendicular to the line of contact but disposed at another angle thereto and would be slightly curved. The cutting edge of the tooth of a cutter is indicated by the dot and dash line U in Fig. 18, and it will be noted how said edge cuts into the metal of the gear tooth, as indicated by the line V, under the shearing action described in connection with Fig. 14, the cutter tooth being shown as having partly rolled into mesh with the gear tooth.

Figures 18, 19, 20:
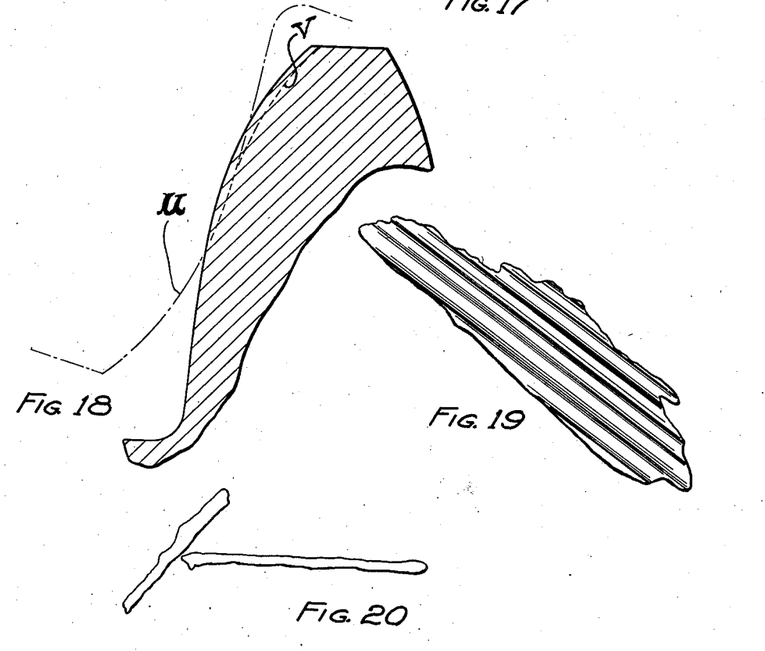
Fig. 18 is an enlarged fragmentary sectional view through the tooth of the gear illustrated in Fig. 17, and schematically shows by dot and dash lines the manner in which the tooth of the cutter rolls in mesh therewith, the section being taken on line 18—18 of Fig. 17, looking in the direction of the arrow.
Fig. 19 is a perspective magnified substantially one hundred times of unbroken chips produced by the cutting edges of a spur cutter rolling in mesh with a spur gear.
Fig. 20 is a plan view of two broken chips enlarged to one hundred magnifications, and produced by a helical cutter rolling in mesh with a helical gear.

In the actual practice of the invention it has been found that distinct chips are sheared from the working face surface of the gear teeth by the cutting action of the cutting edges of the cutters, and Figs. 19 and 20 are reproductions of macrographs of chips produced by the cutters of the type shown herein and enlarged to 100 diameters, Fig. 19 representing a number of chips which have not broken apart and which were produced by a spur cutter upon the spur gear; while Fig. 20 represents two of the separate chips produced by a helical cutter acting upon a helical gear. It has been found that these chips are of a length which, of course, never exceeds the length of the working face surface of the gear tooth and which have substantially uniform width but a very minute thickness, it being understood that the width of the chips is dependent upon the lead and number of the helical grooves in the cutter.

From the foregoing description it will be noted that in the practice of the present invention gears can be finished in a minimum of time, since they are simultaneously shaved and burnished in a single operation. Also, the invention may be practiced upon conventional burnishing machines, or by means of simple attachments on conventional machine tools, thus effecting manufacturing economies, in that the purchase and use of special machines are obviated.

Inasmuch as it is only necessary to give rotational movement to the intermeshed floating work gear and cutter, in addition to a radial pressure feed movement therebetween, to simultaneously shave and burnish the work gear, the invention may be readily practiced and employed to simultaneously shave and burnish a wide variety of gears, such as external and internal gears of various tooth form and also gears on spline shafts. In addition to the types of gears just referred to and which have been illustrated herein, there are other types, of course, which can be shaved and burnished in accordance with the present invention, as, for example, the gears of cluster gears and herringbone gears, it being noted that in connection with the last named type of gears, both gears of a herringbone gear can conveniently and efficiently be simultaneously shaved and burnished at the same time by using separate cutters or a group of cutters for each gear of the herringbone gear, it being understood that the cutters for one of the gears will be of apposite hand to the cutters for the other gear.

In reducing the present invention to actual practice it has been determined that the work gears can be simultaneously shaved and burnished to the desired degree of accuracy and with the desired surface smoothness, compactness and finish by employing substantially 30% less radial pressure between the cutters and work gears than is required in the usual burnishing operation as heretofore practiced. It is believed that this reduction in pressure is due to the ironing or smoothing action of the cutting edges of the cutter upon the working face surfaces of the teeth of the gear, which action assists the burnishing surfaces of the cutters to burnish the gear teeth, wherefore the usual burnishing pressures required may be greatly reduced. It has also been determined by actually reducing the invention to practice that the teeth of the work gears can be refined to within very small limits of error, notwithstanding the fact that after being cut they may have had errors of large magnitude. It has also been found by actually practicing the invention that the shaving action of the cutting or shaving edges of the cutters produce very fine chips, similar to powder or the filings produced by a fine file, wherefore the gear and cutters may be rapidly rotated without requiring excessive torque for that purpose.

Although several embodiments of the invention have been illustrated and described herein, it should be understood that the invention is susceptible of various modifications and adaptations within the scope of the appended claims.

Having thus described my invention I claim:

1. The method of simultaneously shaving and burnishing gears which comprises positioning a work gear in intermeshing relation with a plurality of cutters of gear form corresponding to the work gear and each having a multiplicity of circumferential grooves extending completely around it and through the teeth thereof and having a lead from front to rear thereof and forming a multiplicity of cutting edges and burnishing surfaces, and then rapidly rotating said intermeshed gear and cutters while simultaneously applying pressure to the gear and cutters in a radial direction to simultaneously shave and burnish the working face surfaces of the teeth of the gear.

2. The method of simultaneously shaving and burnishing gears which comprises positioning a work gear in intermeshing relation with a plurality of cutters of gear form corresponding to the work gear and each having a different number of multiple circumferential grooves extending completely around it and through the teeth thereof and having lead from front to rear thereof and forming a multiplicity of cutting edges and burnishing surfaces, and then rapidly rotating said intermeshed gear and cutters to simultaneously shave and burnish the working face surfaces of the teeth of the gear.

3. The method of simultaneously shaving and burnishing internal gears which comprises positioning an internal work gear in intermeshing relation with a plurality of cutters of corresponding external gear form and each having a multiplicity of circumferential helical grooves extending around it and through the teeth thereof and providing a multiplicity of cutting edges and burnishing surfaces, and then rapidly rotating said gear and cutters while in mesh to simultaneously shave and burnish the working face surfaces of the teeth of the gear.

4. The method of simultaneously shaving and burnishing helical gears which comprises positioning a helical work gear in intermeshing relation with a plurality of helical cutters having the same angle of helix as the work gear and each provided with a multiplicity of circumferential helical grooves of the same hand extending through the teeth thereof and forming a multiplicity of cutting edges and burnishing surfaces, and then rapidly rotating said intermeshed gear and cutters to simultaneously shave and burnish the working face surfaces of the teeth of the gear.

5. The method of simultaneously shaving and burnishing gears which comprises positioning a work gear in intermeshing relation with a plurality of cutters of gear form corresponding to the work gear and each having a multiplicity of cutting edges and burnishing surfaces arranged around its circumference in helices extending from end to end of the cutter in an axial direction, and then rapidly rotating said intermeshed gear and cutters to simultaneously shave and burnish the working face surfaces of the teeth of the gear and to produce thereon a composite tooth form conjugate to all of the cutters.

6. The method of simultaneously shaving and burnishing gears which comprises positioning a work gear in intermeshing relation with a plurality of cutters of gear form corresponding to the work gear and each having a multiplicity of circumferential helical grooves extending through the teeth thereof and forming a multiplicity of cutting edges and burnishing surfaces, and then rapidly rotating said intermeshed gear and cutters while applying pressure to the gear and cutters in a radial direction to simultaneously shave and burnish the working face surfaces of the teeth of the gear.

7. The method of simultaneously shaving and burnishing gears which comprises positioning a work gear in intermeshing relation with a plurality of cutters of gear form corresponding to the work gear and each having a different number of multiple circumferential helical grooves extending through the teeth thereof and forming a multiplicity of cutting edges and burnishing surfaces, and then rapidly rotating said intermeshed gear and cutters to simultaneously shave and burnish the working face surfaces of the teeth of the gear.

8. The method of simultaneously shaving and burnishing helical gears, which comprises positioning a helical work gear in intermeshing relation with a plurality of helical cutters and provided with a multiplicity of helical grooves of the same hand as the cutters extending through the teeth thereof and forming a multiplicity of cutting edges and burnishing surfaces, and then rapidly rotating said intermeshed gear and cutters to simultaneously shave and burnish the working face surfaces of the teeth of the gear.

9. The method of simultaneously shaving and burnishing internal gears, which comprises positioning an internal gear in intermeshing relation with a plurality of cutters of corresponding external gear form and lesser number of teeth than the work gear and each having a multiplicity of circumferential grooves extending through the teeth thereof and providing a multiplicity of cutting edges and burnishing surfaces thereon having lead from front to rear thereof, and then rapidly rotating said gear and cutters while in mesh to simultaneously shave and burnish the working face surfaces of the teeth of the gear.

10. The method of simultaneously shaving and burnishing gears, which comprises positioning a work gear in intermeshing relation with a plurality of cutters of gear form corresponding to the work gear and each having a multiple series of cutting edges and burnishing surfaces having lead axially thereof, the axes of the gear and cutters being arranged in parallel relationship, and then rapidly rotating said intermeshed gear and cutters while applying radial pressure therebetween to simultaneously shave and burnish the working face surfaces of the teeth of the work gear and to produce thereon a composite tooth form conjugate to all of the cutters.

11. The method of simultaneously shaving and burnishing internal gears, which comprises positioning an internal work gear in intermeshing relation with a plurality of cutters of corresponding external gear form and each having a multiple series of cutting edges and burnishing surfaces having lead axially of the cutter, the axes of the gear and cutters being arranged in parallel relationship, and then rapidly rotating said intermeshed gear and cutters while applying pressure radially therebetween to simultaneously shave and burnish the working face surfaces of the teeth of the gear.

12. The method of simultaneously shaving and burnishing gears which comprises positioning a work gear in relatively floating intermeshing relationship with a plurality of cutters of gear form corresponding to the work gear and each having a multiplicity of circumferential grooves extending around it and through the teeth thereof and having lead from front to back thereof and forming a multiplicity of cutting edges and burnishing surfaces, and then rapidly rotating said intermeshed gear and cutters while simultaneously applying pressure to the gear and cutters in a radial direction to simultaneously shave and burnish the working face surfaces of the teeth of the gear.

13. The method of simultaneously shaving and burnishing gears which comprises positioning a work gear in relatively floating intermeshing relationship with a plurality of cutters of gear form corresponding to the work gear and each having a multiplicity of circumferential helical grooves extending through the teeth thereof and forming a multiplicity of cutting edges and burnishing surfaces, and then rapidly rotating said intermeshed gear and cutters while applying pressure to the gear and cutters in a radial direction to simultaneously shave and burnish the working face surfaces of the teeth of the gear.

14. The method of simultaneously shaving and burnishing helical gears which comprises positioning a helical work gear in relatively floating intermeshing relationship with a plurality of cutters in the form of helical gears and provided with a multiplicity of helical grooves of the same hand as the cutters extending through the teeth thereof and forming a multiplicity of cutting edges and burnishing surfaces, and then rapidly rotating said intermeshed gear and cutters to simultaneously shave and burnish the working face surfaces of the teeth of the gear.

15. The method of simultaneously shaving and burnishing spur gears which comprises positioning a spur work gear in relative floating intermeshing relationship with a plurality of cutters in the form of spur gears and provided with a multiplicity of helical grooves extending through the teeth thereof and forming a multiplicity of cutting edges and burnishing surfaces thereon, and then rapidly rotating said intermeshed gear and cutter while simultaneously applying radial pressure therebetween to simultaneously shave and burnish the working face surfaces of the teeth of the gear.

16. The method of simultaneously shaving and burnishing gears which comprises positioning a work gear in relatively floating intermeshing relationship with a plurality of cutters of gear form corresponding to the work gear and each provided with a multiplicity of separate helical grooves extending around it and through the teeth thereof and forming a multiplicity of cutting edges and burnishing surfaces thereon, and then rapidly rotating said intermeshed gear and cutters while simultaneously applying radial pressure therebetween to simultaneously shave and burnish the working face surfaces of the teeth of the work gear.

17. The method of simultaneously shaving and burnishing gears which comprises positioning a work gear in relatively floating intermeshing relationship with a plurality of cutters of gear form corresponding to the work gear and each provided with a multiplicity of cutting edges and burnishing surfaces and the teeth thereof formed by a circumferential helical groove of small lead and many spires extending around it and through the teeth thereof, and then rapidly rotating said intermeshed gear and cutters while simultaneously applying radial pressure therebetween to simultaneously shave and burnish the working face surfaces of the teeth of the gear.

OLIVER G. SIMMONS.